United States Patent Office 2,943,197
Patented June 28, 1960

2,943,197

METHOD OF WELL LOGGING

Leendert de Witte, Ponca City, Okla., assignor to Continental Oil Company, Ponca City, Okla., a corporation of Delaware No Drawing. Filed Oct. 14, 1954, Ser. No. 462,369

2 Claims. (Cl. 250—43.5)

This invention relates to a method of logging a well to determine therein points of entry of different fluids.

In the production of wells and especially oil wells wherein several fluids enter the well stream throughout its producing length, wherein one of such fluids is not desired in the final output of the well, it is often possible to eliminate the entry of the undesired fluid if the levels where it enters the well stream are known. For instance, if it is possible to determine that brine enters the bore of an oil well at a certain depth, then by well known procedures, the walls of the well bore can be cemented over at that depth, thereby reducing the brine content in the fluid produced by the well.

The problems confronting the determination of points of entry of different fluids are basically the following:

Soon after the fluids enter the well they begin to mix so that the measurements taken should be analyses of a sufficiently large volume of the fluids in the well, such that said volume will give a fair representation of the fluids entering at that level.

The method of taking samples of the produced fluid at the levels where they enter the well bore would be impractical because accurate sampling would involve fairly large samples and an unwieldly number of them.

It is, therefore, the principal object of this invention to provide a method of logging a well to determine therein points of entry of several different fluids.

It is a further object of this invention to provide a method of logging a well to determine therein points of entry of several fluids, which method will result in the production of a log indicating the quantities of the various fluids contained in the well throughout its length.

It is a further object of the invention to provide a method of logging a well that will be independent of the physical conditions in the well.

It is a further object of this invention to provide a method of logging a well to determine therein points of entry of two different fluids which method consists of making a record of the ratio of the amount of one fluid in the well at each level to the amount of the other fluid in the well at that level.

It is a further object of the invention to provide a method of logging a well to determine therein points of entry of brine.

It is a further object of this invention to provide a method of logging a well to determine therein points of entry of oil and brine.

How the foregoing and related ends are accomplished will be described in the following specification and more distinctly pointed out in the appended claims.

Broadly stated, my invention consists of the method of logging a well to determine therein points of entry of a fluid containing an element which when subjected to neutron bombardment will have a relatively narrow range of gamma ray emission, which comprises traversing the well with an assemblage comprising a gamma ray detector and in fixed spaced relation therewith means directing a neutron stream along the axis of the well toward said detector, and making a log of the detector signals which represent a relatively narrow range of gamma ray energy levels, which range includes the energy level of the gamma ray of neutron capture of said element in said entering fluid; and The method of logging a well to determine therein points of entry of two different fluids containing elements which when subjected to neutron bombardment will have relatively narrow distinct energy ranges of gamma ray emission which comprises:

(a) Traversing the well with an assemblage comprising a gamma ray detector and in fixed space relation therewith means directing a neutron stream along the axis of the well in the direction of the detector;

(b) Selecting a relatively narrow range of the detector signals which represent gamma ray energy levels, which range includes the energy level of the gamma ray of neutron capture of one of the elements found in one fluid but not in the other;

(c) Selecting a relatively narrow range of the detector signals which represent gamma ray energy levels, which range includes the energy level of the gamma ray of neutron capture of one of the elements common to both fluids; and (d) Making a log of the ratio of the signals selected under (b), to the signals selected under (c).

When elements are bombarded by neutrons, they give off gamma rays and each element gives off gamma rays of a different energy level. These gamma rays, due to neutron bombardment will be referred to hereinafter as gamma rays of neutron capture.

When in a mixture of several fluids, one fluid contains an element not found in the other fluids, the amount of that one fluid in the mixture can be determined if the gamma rays of neutron capture of the element found only in that fluid have an energy level sufficiently distinct from the energy levels of the gamma rays of neutron capture of all the other elements found in the mixture.

For instance, when analyzing a mixture of oil and brine wherein the brine contains the elements chlorine and sodium not contained in the oil, the energy levels of the gamma rays of neutron capture given off by sodium and by chlorine, when the mixture has been bombarded by neutrons, are sufficiently distinct from the energy levels of the gamma rays of neutron capture of all the other elements in the mixture, so that when all the gamma rays emitted by the mixture are detected, the signal of either those due to sodium or those due to chlorine can be selected from the total signal. When the amount of sodium or chlorine in the brine is known, the detected signal due to either sodium or chlorine can be interpreted directly to yield the amount of brine in the mixture.

In the present invention, a sonde containing a source of neutrons and a gamma ray detector is moved continuously through an oil well. The detector and the neutron source are separated by about 12″ such that the volume of fluids analyzed at each point along the well is large enough that an accurate representation of the fluids entering the well at the point is obtained.

The detector is connected to a logging recorder through a circuit containing a suitable pulse-height discriminator which discriminates against all signals except those corresponding to energies which are within 10% of the energy of the signal representative of the gamma rays of neutron capture by either sodium or chlorine. The logging recorder is calibrated from measurements taken of the brine separated from the fluids delivered by the well so that the recorder shows a continuous depth chart trace which indicates the amounts of brine present in the well and at what depths they are present.

The particular source of neutrons used is not critical. Examples of neutron sources which would be adequate are the neutron streams provided by the action of a radioactive element on one of the following: aluminum, beryllium, boron, lithium, magnesium, phosphorus and sodium. The most likely neutron source would be a mixture of radium and beryllium or a mixture of polonium and beryllium. In operation the neutron stream should be directed along the axis of the well so that the measurements are not affected too greatly by the elements in the surrounding rock.

The gamma ray detector used may be of any type known to the art.

My method may be extended as follows. As is described above, the signals representative of the gamma rays of neutron capture by an element contained only in the brine are measured, and in the same way and at the same time the signals representative of the gamma rays of neutron capture by an element found only in the oil or in both the oil and the brine are measured. The ratio of these two measurements is then recorded on the depth chart and because this ratio is the ratio of two similar measurements which were taken under the same physical conditions, the resulting log obtained is independent of these physical conditions.

When the two fluids, whose points of entry into the well are being measured, are oil and brine, the ratio recorded could be the ratio of the gamma rays of neutron capture of either sodium or chlorine to the gamma rays of neutron capture of either hydrogen or carbon.

My invention provides a method which yields a record of the amount and location of fluid entry into the wells. This method is rapid, efficient and accurate and results in the determination of information heretofore very difficult to obtained.

Other modes of applying the principle of the invention may be employed, change being made as regards the details described, provided the features stated in any of the following claims, or the equivalent of such, be employed.

I, therefore, particularly point out and distinctly claim as my invention:

1. The method of logging a well to determine therein points of entry of a fluid containing an element, which element, when subjected to neutron bombardment, will have a relatively narrow range of gamma ray emission, which comprises traversing the well with an assemblage comprising a gamma ray detector and in fixed spaced relation therewith means directing a neutron stream along the axis of the well toward said detector, and making a log of the detector signals which represent a relatively narrow range of gamma ray energy levels, which range includes the energy level of the gamma ray of neutron capture of said element in said entering fluid.

2. The method of logging a well to determine therein points of entry of two different fluids containing elements which when subjected to neutron bombardment will have relatively narrow distinct energy ranges of gamma ray emission which comprises:

(a) Traversing the well with an assemblage comprising a gamma ray detector and in fixed space relation therewith means directing a neutron stream along the axis of the well in the direction of the detector;

(b) Selecting a relatively narrow range of the detector signals representative of gamma ray energy levels which range includes the energy level of the gamma ray of neutron capture of one of the elements found in one fluid but not in the other;

(c) Selecting a relatively narrow range of the detector signals representative of gamma ray energy levels which range includes the energy level of the gamma ray of neutron capture of one of the elements common to both fluids; and (d) Making a log of the ratio of the signals selected under (b), to the signals selected under (c).

References Cited in the file of this patent
UNITED STATES PATENTS

| | | |
|---|---|---|
| 2,463,733 | Albaugh | Mar. 8, 1949 |
| 2,667,583 | Herzog | Jan. 26, 1954 |
| 2,710,925 | McKay | June 14, 1955 |
| 2,712,081 | Fearon et al. | June 28, 1955 |
| 2,735,944 | Greer | Feb. 21, 1956 |
| 2,744,199 | Juterbock et al. | May 1, 1956 |
| 2,752,504 | McKay | June 26, 1956 |